Patented Aug. 28, 1923.

1,466,578

UNITED STATES PATENT OFFICE.

ISABEL CLIFTON, OF BARBERVILLE, FLORIDA.

PYORRHEA REMEDY.

No Drawing.  Application filed August 20, 1921. Serial No. 493,944.

*To all whom it may concern:*

Be it known that I, ISABEL CLIFTON, a citizen of the United States, residing at Barberville, in the county of Volusia and State of Florida, have invented certain new and useful Improvements in Pyorrhea Remedies, of which the following is a specification.

My invention relates to a preparation for the treatment of pyorrhea and other diseases of the gums and the method of compounding or manufacturing the same.

In the manufacture of said preparation the following ingredients in the quantities and proportions substantially as stated are used and compounded in the manner described.

I take: myrtle root, 2 pounds; honey, 1 ounce or 330 grains; borax, 61 grains; lump alum, 6 drams or 15 grains; alcohol, 1 gill.

The myrtle root (*Myrica pumila*) is first crushed and then put into one (1) gallon of water and boiled until reduced to one (1) quart or one-fourth ($\frac{1}{4}$) of its original volume. This liquid is then strained and to it is added and mixed therewith the above quantities of the other ingredients except the alcohol. The whole is then again boiled for fifteen (15) minutes, then filtered and to this is added the alcohol. The whole is thoroughly mixed by shaking or agitation and should make one (1) quart of the medicine.

The preparation is used as a mouth wash in the usual manner of using mouth washes, either with a tooth brush or merely as a liquid with which to rinse the mouth and gums.

Having thus fully described my said invention, what I claim as new and desire to secure by Letters Patent, is:

1. A pyorrhea remedy containing myrtle root, honey, borax, alum, and alcohol, substantially in the proportions specified.

2. A pyorrhea remedy containing an extract of myrtle root combined with honey, borax, alum, and alcohol in substantially the proportions specified.

3. The method of preparing pyorrhea remedy which consists in boiling two pounds of myrtle root in one gallon of water until the whole is reduced to substantially one-fourth its original quantity, then mixing therewith honey, borax, alum, and alcohol in substantially the proportions specified.

In witness whereof, I have hereunto set my hand and seal at Barberville, Florida this 8th day of August, A. D. nineteen hundred and twenty-one.

ISABEL CLIFTON. [L. S.]

Witnesses:
J. S. ROGERS,
J. E. ALEXANDER.